(12) United States Patent
Maxim et al.

(10) Patent No.: US 11,018,702 B2
(45) Date of Patent: May 25, 2021

(54) MULTI-RADIO ACCESS TECHNOLOGY CIRCUIT

(71) Applicant: Qorvo US, Inc., Greensboro, NC (US)

(72) Inventors: George Maxim, Saratoga, CA (US); Dirk Robert Walter Leipold, San Jose, CA (US); Alexander Wayne Hietala, Phoenix, AZ (US); Baker Scott, San Jose, CA (US)

(73) Assignee: Qorvo US, Inc., Greensboro, NC (US)

( * ) Notice: Subject to any disclaimer, the term of this patent is extended or adjusted under 35 U.S.C. 154(b) by 13 days.

(21) Appl. No.: 16/119,409

(22) Filed: Aug. 31, 2018

(65) Prior Publication Data

US 2019/0326941 A1    Oct. 24, 2019

Related U.S. Application Data

(60) Provisional application No. 62/660,356, filed on Apr. 20, 2018.

(51) Int. Cl.
| | | |
|---|---|---|
| *H04B 1/00* | (2006.01) | |
| *H04B 1/40* | (2015.01) | |
| *H04W 88/06* | (2009.01) | |

(52) U.S. Cl.
CPC ........... *H04B 1/0082* (2013.01); *H04W 88/06* (2013.01)

(58) Field of Classification Search
CPC .............................. H04B 1/0082; H04W 88/06
See application file for complete search history.

(56) References Cited

U.S. PATENT DOCUMENTS

| | | | |
|---|---|---|---|
| 2008/0014992 A1* | 1/2008 | Pescod ................... | H01Q 1/246 455/562.1 |
| 2009/0160430 A1* | 6/2009 | Brown ................... | G01R 23/16 324/76.23 |

(Continued)

OTHER PUBLICATIONS

International Search Report and Written Opinion for International Patent Application No. PCT/US2019/028008, dated Jun. 26, 2019, 12 pages.

(Continued)

*Primary Examiner* — Jinsong Hu
*Assistant Examiner* — Farideh Madani
(74) *Attorney, Agent, or Firm* — Withrow & Terranova, P.L.L.C.

(57) ABSTRACT

A multi-radio access technology (RAT) circuit is provided. The multi-RAT circuit includes a radio frequency (RF) circuit(s) coupled to an interconnect medium(s). The RF circuit(s) includes a power head circuit configured to receive a local oscillation (LO) pilot and an RF signal via the interconnect medium(s). The power head circuit generates an LO signal based on the LO pilot without requiring a synthesizer. Accordingly, the power head circuit modulates the RF signal to a carrier band based on the LO signal for transmission in a millimeter wave (mmWave) spectrum. By generating the LO signal and modulating the RF signal to the carrier band in the power head circuit, it may be possible to minimize attenuation and/or interference to the RF signal. Further, it may also be possible to share the interconnect medium(s) with existing RATs, thus helping to reduce size, power, and cost impacts associated with supporting an mmWave RAT.

23 Claims, 10 Drawing Sheets

(56) References Cited

U.S. PATENT DOCUMENTS

| | | | |
|---|---|---|---|
| 2011/0159835 A1* | 6/2011 | Xuan | H03L 7/0991 |
| | | | 455/323 |
| 2011/0201269 A1* | 8/2011 | Hobbs | H04B 7/15535 |
| | | | 455/9 |
| 2014/0099108 A1* | 4/2014 | Yu | H04B 10/64 |
| | | | 398/48 |
| 2015/0117872 A1* | 4/2015 | Lyubomirsky | H04J 14/06 |
| | | | 398/205 |
| 2015/0180760 A1* | 6/2015 | Rickard | H04L 25/00 |
| | | | 370/252 |
| 2016/0211898 A1* | 7/2016 | Cai | H04B 7/0617 |
| 2017/0079038 A1 | 3/2017 | Gerszberg et al. | |
| 2018/0054298 A1 | 2/2018 | Leipold et al. | |
| 2018/0115082 A1* | 4/2018 | Johnson | H01Q 1/36 |

OTHER PUBLICATIONS

International Preliminary Report on Patentability for International Patent Application No. PCT/US2019/028008, dated Oct. 29, 2020, 7 pages.

\* cited by examiner

MULTI-RADIO ACCESS TECHNOLOGY CIRCUIT

RELATED APPLICATIONS

This application claims the benefit of provisional patent application Ser. No. 62/660,356, filed Apr. 20, 2018, the disclosure of which is hereby incorporated herein by reference in its entirety.

FIELD OF THE DISCLOSURE

The technology of the disclosure relates generally to a circuit(s) capable of supporting multiple radio access technologies (RATs).

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

Fifth-generation (5G) new radio (NR) (5G-NR) wireless communication technology has been widely regarded as the next generation of wireless communication standards beyond the current third-generation (3G), fourth-generation (4G), and fifth-generation (5G) communication standards. A 5G-NR capable mobile communication device is expected to achieve significantly higher data rates, improved coverage range, enhanced signaling efficiency, and reduced latency compared to a conventional mobile communication device supporting only the 3G, 4G, and/or 5G communication standards.

The 5G-NR capable mobile communication device can be configured to transmit a 5G-NR RF signal(s) in millimeter wave (mmWave) spectrum(s) that is typically higher than 18 GHz. Accordingly, the 5G-NR RF signal(s) is also referred to as an mmWave RF signal(s) hereinafter. Notably, the mmWave RF signal(s) can be susceptible to attenuation and interference resulting from various sources. For example, the mmWave RF signal(s) can be attenuated due to insertion loss associated with an interconnect medium(s) and/or interfered by clock spur coupling. As such, it may be desirable to minimize mmWave signal attenuation and interference such that the 5G-NR capable mobile communication device can realize expected full potentials of the 5G-NR technology. Furthermore, given that the 5G-NR technology typically needs to co-exist with the existing 3G, 4G, and 5G technologies, it may be further desired to reuse existing 3G/4G/5G hardware components (e.g., transceiver, interconnect, etc.) to minimize add-on size, power, and cost associated with supporting the 5G-NR technology.

SUMMARY

Embodiments of the disclosure relate to a multi-radio access technology (multi-RAT) circuit. In a non-limiting example, the multi-RAT circuit can be configured to support concurrently third-generation (3G), fourth-generation (4G), fifth-generation (5G), and 5G new radio (5G-NR) RATs. In examples discussed herein, the multi-RAT circuit includes a radio frequency (RF) circuit(s) coupled to an interconnect medium(s). The RF circuit(s) includes a power head circuit that may be configured to support the 5G-NR RAT in millimeter wave (mmWave) spectrum. The power head circuit receives a local oscillation (LO) pilot and an RF signal via the interconnect medium(s). The power head circuit can be configured to generate an LO signal based on the LO pilot without requiring a synthesizer. Accordingly, the power head circuit modulates the RF signal to a carrier band based on the LO signal for transmission in the mmWave spectrum. By generating the LO signal and modulating the RF signal to the carrier band locally in the power head circuit, it may be possible to minimize attenuation and/or interference to the RF signal. Further, it may also be possible to share the interconnect medium(s) with existing 3G, 4G, and/or 5G RATs, thus helping to reduce size, power, and cost impacts associated with supporting the 5G-NR RAT.

In one aspect, a multi-RAT circuit is provided. The multi-RAT circuit includes at least one interconnect medium. The at least one interconnect medium is configured to propagate a radio frequency (RF) signal in a signal band and propagate a local oscillation (LO) pilot at an LO frequency. The multi-RAT circuit also includes at least one RF circuit coupled to the at least one interconnect medium. The at least one RF circuit includes a power head circuit. The power head circuit is configured to receive the RF signal and the LO pilot from the at least one interconnect medium. The power head circuit is also configured to generate the LO signal based on the LO pilot. The power head circuit is configured to modulate the RF signal from the signal band to a carrier band based on the LO signal. The power head circuit is also configured to transmit the RF signal in the carrier band.

In another aspect, a multi-RAT apparatus is provided. The multi-RAT apparatus includes at least one transceiver circuit. The multi-RAT apparatus also includes a first number of RF circuits. The multi-RAT apparatus also includes a second number of interconnect mediums coupled between the at least one transceiver circuit and the first number of RF circuits. At least one RF circuit among the first number of RF circuits includes a power head circuit. The power head circuit is configured to receive a RF signal in a signal band and an LO pilot at an LO frequency from a respective interconnect medium among the second number of interconnect mediums. The power head circuit is also configured to generate an LO signal based on the LO pilot. The power head circuit is also configured to modulate the RF signal from the signal band to a carrier band based on the LO signal. The power head circuit is also configured to transmit the RF signal in the carrier band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a multi-radio access technology (multi-RAT) circuit. In a non-limiting example, the multi-RAT circuit can be configured to support concurrently third-generation (3G), fourth-generation (4G), fifth-generation (5G), and 5G new radio (5G-NR) RATs. In examples discussed herein, the multi-RAT circuit includes a radio frequency (RF) circuit(s) coupled to an interconnect medium(s). The RF circuit(s) includes a power head circuit that may be configured to support the 5G-NR RAT in millimeter wave (mmWave) spectrum. The power head circuit receives a local oscillation (LO) pilot and an RF signal via the interconnect medium(s). The power head circuit can be configured to generate an LO signal based on the LO pilot without requiring a synthesizer. Accordingly, the power head circuit modulates the RF signal to a carrier band based on the LO signal for transmission in the mmWave spectrum. By generating the LO signal and modulating the RF signal to the carrier band locally in the power head circuit, it may be possible to minimize attenuation and/or interference to the RF signal. Further, it may also be possible to share the interconnect medium(s) with existing 3G, 4G, and/or 5G RATs, thus helping to reduce size, power, and cost impacts associated with supporting the 5G-NR RAT.

Figure 1:
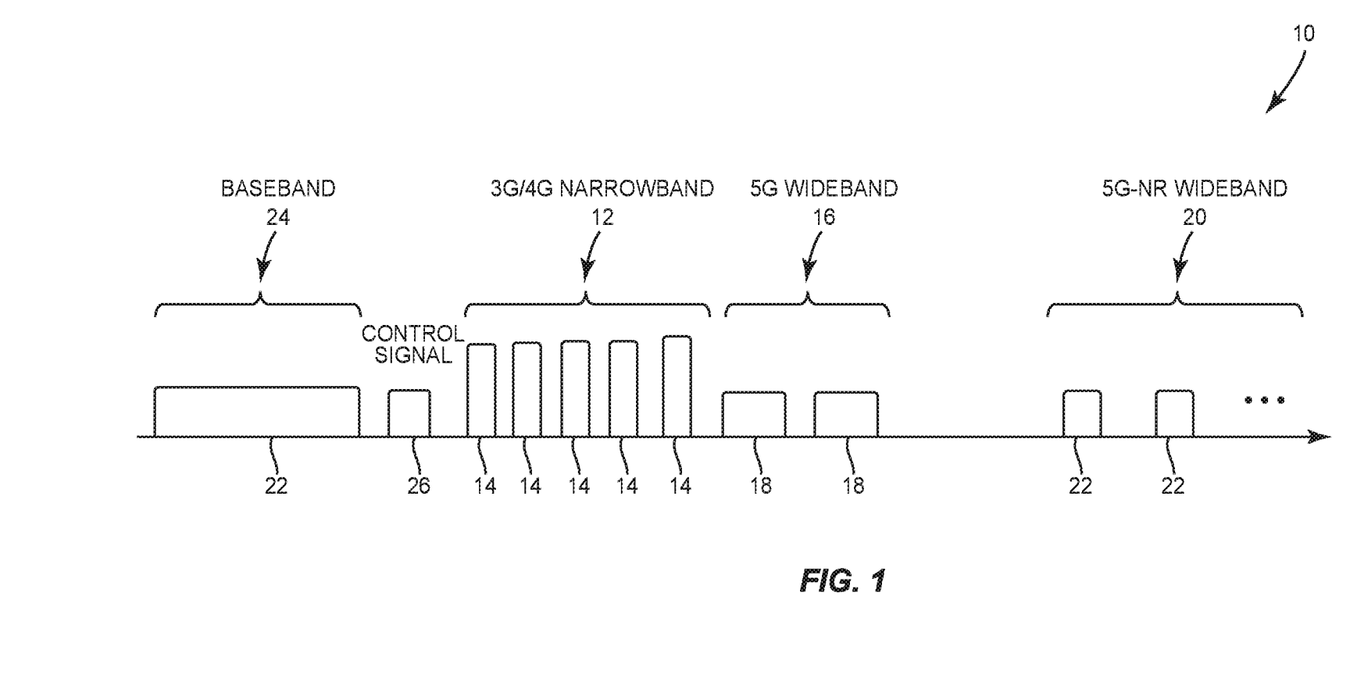
FIG. 1 is a conventional spectrum map for concurrently supporting third-generation (3G), fourth-generation (4G), fifth-generation (5G), and 5G new radio (5G-NR) radio access technologies (RATs)

Before discussing the multi-RAT circuit of the present disclosure, a brief overview of a conventional spectrum map is first provided with reference to FIG. 1 to help understand challenges associated with concurrently supporting 3G, 4G, 5G, and 5G-NR RATs in a mobile communication device. The discussion of specific exemplary aspects of a multi-RAT circuit according to the present disclosure starts below with reference to FIG. 2.

In this regard, FIG. 1 is a conventional spectrum map 10 for concurrently supporting 3G, 4G, 5G, and 5G-NR RATs in a mobile communication device. The conventional spectrum map 10 includes a 3G/4G narrowband 12 for communicating 3G/4G RF signals 14 based on a 3G/4G RAT and a 5G wideband 16 for communicating 5G RF signals 18 based on a 5G RAT. In a non-limiting example, the 3G/4G narrowband 12 extends from approximately 700 MHz to approximately 3.0 GHz and the 5G wideband 16 extends from approximately 3.3 GHz to approximately 8.0 GHz. The conventional spectrum map 10 also includes an mmWave wideband 20 (also referred to as 5G-NR wideband), which is located above 18 GHz, for communicating 5G-NR RF signals 22 based on a 5G-NR RAT.

According to earlier discussions, the 5G-NR RF signals 22 can be susceptible to attenuation resulting from, for example, an interconnect medium that carries the 5G-NR RF signals 22 from a baseband circuit (not shown) to an RF front-end module (FEM) (not shown). In this regard, a conventional approach is to modulate the 5G-NR RF signals 22 to a baseband 24 for communication from the baseband transceiver to the RF FEM. The 5G-NR RF signals 22 are subsequently up-converted from the baseband 24 to the mmWave wideband 20 at the RF FEM. By propagating the 5G-NR RF signals 22 in the baseband 24, it may be possible to mitigate signal attenuation caused by the interconnect medium.

However, the conventional approach may have some potential issues. In one aspect, it may be necessary to first shift control signals 26 from the baseband 24 to a higher frequency to make room for the 5G-NR RF signals 22. As a result, the control signals 26 may become more susceptible to interference and thus less reliable. In another aspect, the RF FEM may need to include a synthesizer to generate an LO signal for up-converting the 5G-NR RF signals 22 from the baseband 24 to the mmWave wideband 20. As such, a wideband phase-locked loop (PLL) may be needed in the RF FEM to ensure fast locking and fast channel switching. However, the wideband PLL may interact with other active components in the RF FEM to create various pulling issues. As such, it may be desirable to communicate the 5G-NR RF signals 22 outside the baseband 24 concurrent to eliminating the synthesizer from the RF FEM.

Figure 2:
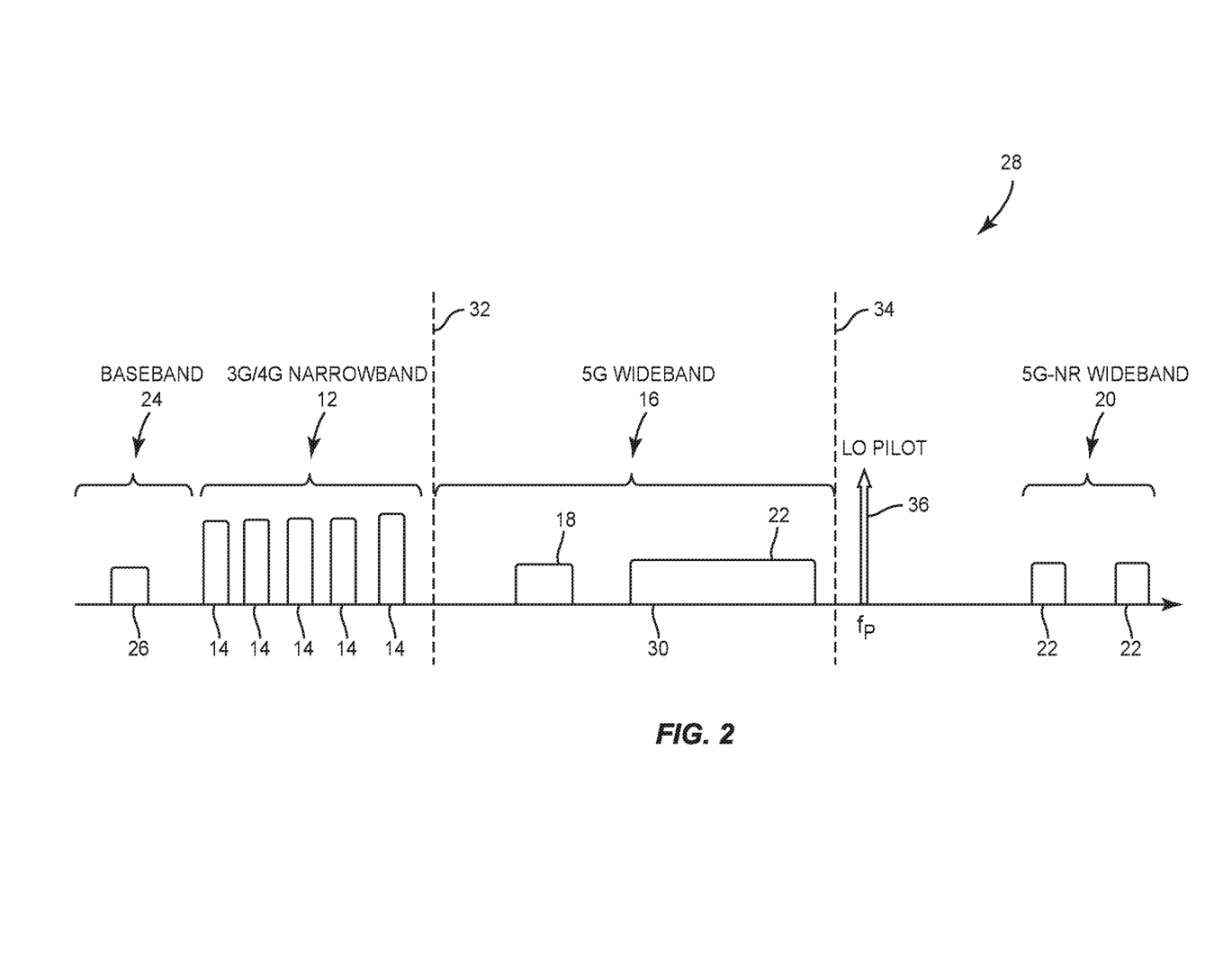
FIG. 2 is an enhanced spectrum map in accordance to an embodiment of the present disclosure for supporting 3G, 4G, 5G, and 5G-NR RATs.

In this regard, FIG. 2 is an enhanced spectrum map 28 in accordance to an embodiment of the present disclosure for supporting 3G, 4G, 5G, and 5G-NR RATs. Common elements between FIGS. 1 and 2 are shown therein with common element numbers and will not be re-described herein.

In contrast to modulating the 5G-NR RF signals 22 to the baseband 24, it may be possible to modulate the 5G-NR RF signals 22 to an intermediate frequency (IF) band 30 collocated with the 5G RF signals 18 in the 5G wideband 16 (also referred to as "defined frequency spectrum"), which is defined by a lower frequency boundary 32 and an upper frequency boundary 34. For example, the 5G RF signals 18 may be in 5G ultra-high-band (UHB) 43 extending from 3.6 GHz to 3.7 GHz. In this regard, the IF band 30 can be located anywhere in the 5G wideband 16 as long as the IF band 30 does not overlap with the 5G UHB 43. As a result, the baseband 24 can be freed up for communicating the control signals 26, thus eliminating the need to up-shift the control signals 26 to higher frequencies.

In addition, an LO pilot 36 can be generated at an LO frequency fp that is higher than the upper frequency boundary 34 of the 5G wideband 16. In a non-limiting example, the LO frequency fp can be located at a sub-harmonic of an LO signal needed to perform up-conversion and/or down-conversion (e.g., between 8 GHz and 9 GHz). The LO pilot 36 may be communicated to an RF FEM together with or separately from the 5G-NR RF signals 22. Accordingly, the RF FEM can generate the LO signal based on the LO pilot 36 for up-converting the 5G-NR RF signals 22 from the baseband 24 to the mmWave wideband 20, without the need for a synthesizer.

Figure 3:
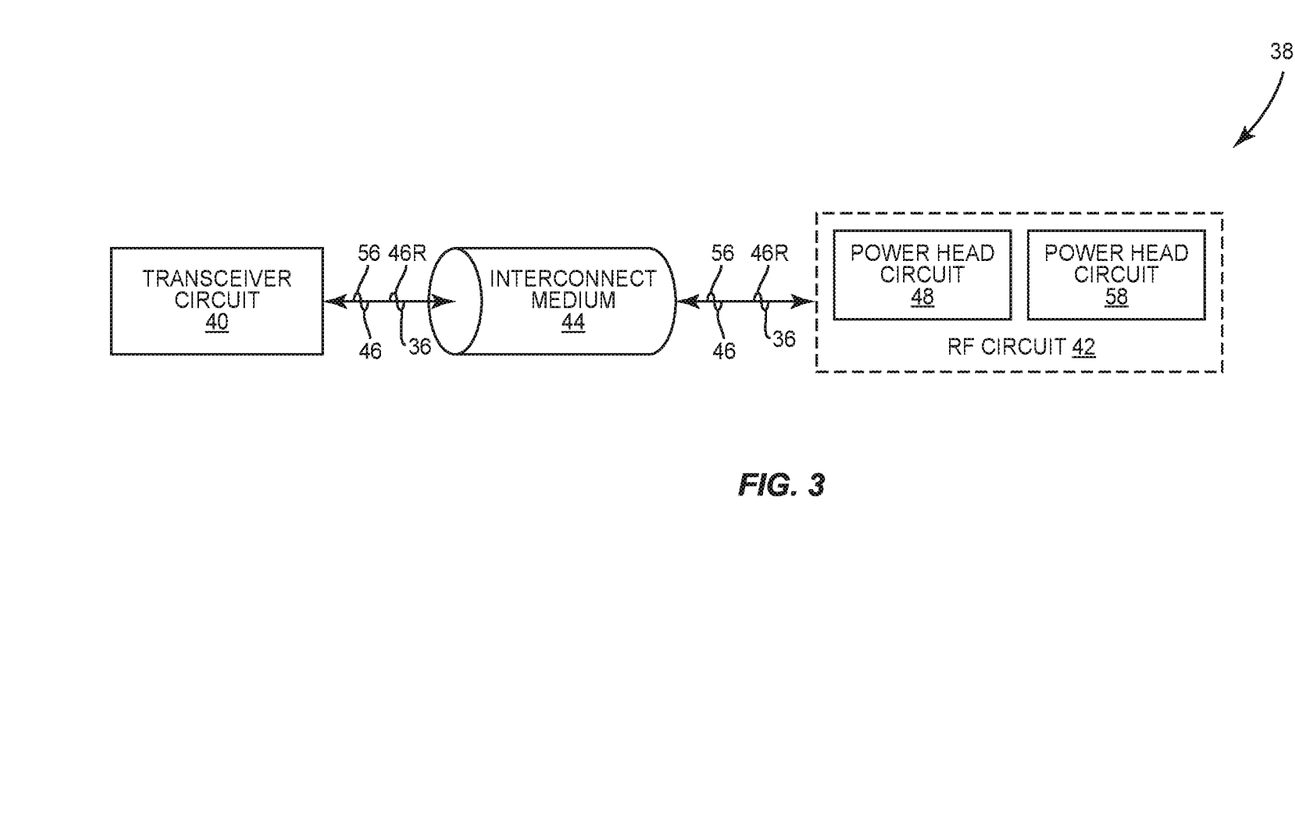
FIG. 3 is a schematic diagram of an exemplary multi-RAT circuit configured according to an embodiment of the present disclosure to operate based on the enhanced spectrum map of FIG. 2.

In this regard, FIG. 3 is a schematic diagram of an exemplary multi-RAT circuit 38 configured according to an embodiment of the present disclosure to operate based on the enhanced spectrum map 28 of FIG. 2. Elements of FIG. 2 are referenced in conjunction with FIG. 3 and will not be re-described herein.

The multi-RAT circuit 38 includes a transceiver circuit 40 and at least one RF circuit 42. The transceiver circuit 40 is coupled to the RF circuit 42 by at least one interconnect medium 44, which can be a conductive flex or a conductive wire for example. The transceiver circuit 40 is configured to generate an RF signal 46 (e.g., the 5G-NR RF signals 22) in a signal band (e.g., the IF band 30) and the LO pilot 36 at the LO frequency fp. The interconnect medium 44 propagates the RF signal 46 and the LO pilot 36 from the transceiver circuit 40 to the RF circuit 42. The transceiver circuit 40 may be further configured to receive an RF receive signal 46R from the RF circuit 42 via the interconnect medium 44.

The RF circuit 42 may include a power head circuit 48. The power head circuit 48 can include a front-end transceiver (not shown) and an RF FEM (not shown) for communicating an RF signal(s) based on a respective RAT. In a non-limiting example, the power head circuit 48 can be a 5G-NR power head circuit configured to communicate a 5G-NR RF signal in the mmWave wideband 20.

Figure 4:
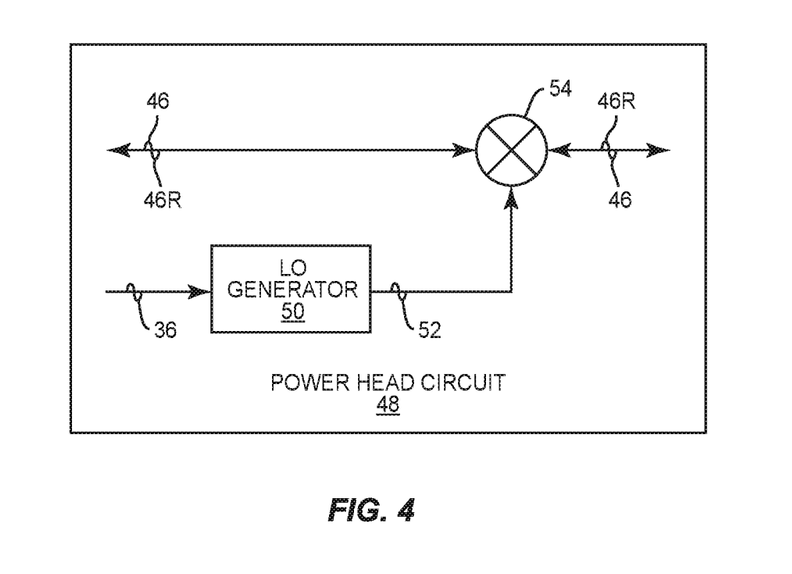
FIG. 4 is a schematic diagram providing an exemplary illustration of a power head circuit provided in the multi-RAT circuit of FIG. 3 according to one embodiment of the present disclosure.

FIG. 4 is a schematic diagram providing an exemplary illustration of the power head circuit 48 according to one embodiment of the present disclosure. Common elements between FIGS. 3 and 4 are shown therein with common element numbers and will not be re-described herein.

The power head circuit 48 includes an LO generator 50 configured to generate an LO signal 52 based on the LO pilot 36. In a non-limiting example, the LO generator 50 multiplies the LO pilot 36 by a predetermined multiplying factor (e.g., 4 or 5) to generate the LO signal 52. The power head circuit 48 also includes a modulator 54. The modulator 54 is configured to modulate (e.g., up-convert) the RF signal 46 from the signal band (e.g., the IF band 30 of FIG. 2) to a carrier band (e.g., 5G-NR band) in the mmWave wideband 20 of FIG. 2. By generating the LO signal 52 based on the LO generator 50, it is no longer necessary to provide a synthesizer in the power head circuit 48, thus helping to mitigate the various pulling issues as mentioned earlier. As an alternative to employing the LO generator 50 in the power head circuit 48, it may also be possible to employ an injection-locked/frequency-locked voltage controlled oscillator (VCO) in the power head circuit 48 to generate the LO signal 52 based on the LO pilot 36. The power head circuit 48 may receive the RF receive signal 46R in the carrier band. Accordingly, the modulator 54 is further configured to modulate (e.g., down-convert) the RF receive signal 46 from the carrier band to the signal band (e.g., the IF band 30 of FIG. 2). It should be appreciated that the power head circuit 48 may include a separate modulator for down-converting the RF receive signal 46R based on the LO signal 52.

With reference back to FIG. 3, the transceiver circuit 40 is further configured to generate a second RF signal 56 (e.g., the RF signals 18) in a second signal band (e.g., 5G UHB 43) and the interconnect medium 44 is further configured to propagate the second RF signal 56 from the transceiver circuit 40 to the RF circuit 42. The RF circuit 42 may include a second power head circuit 58, which can include a front-end transceiver (not shown) and an RF FEM (not shown) for communicating an RF signal(s) based on a respective RAT. In a non-limiting example, the second power head circuit 58 can be a 5G power head circuit configured to communicate a 5G RF signal in the 5G wideband 16. Accordingly, the second power head circuit 58 receives the second RF signal 56 from the interconnect medium 44 and transmits the second RF signal 56 in the second signal band in the 5G wideband 16.

Figure 5:
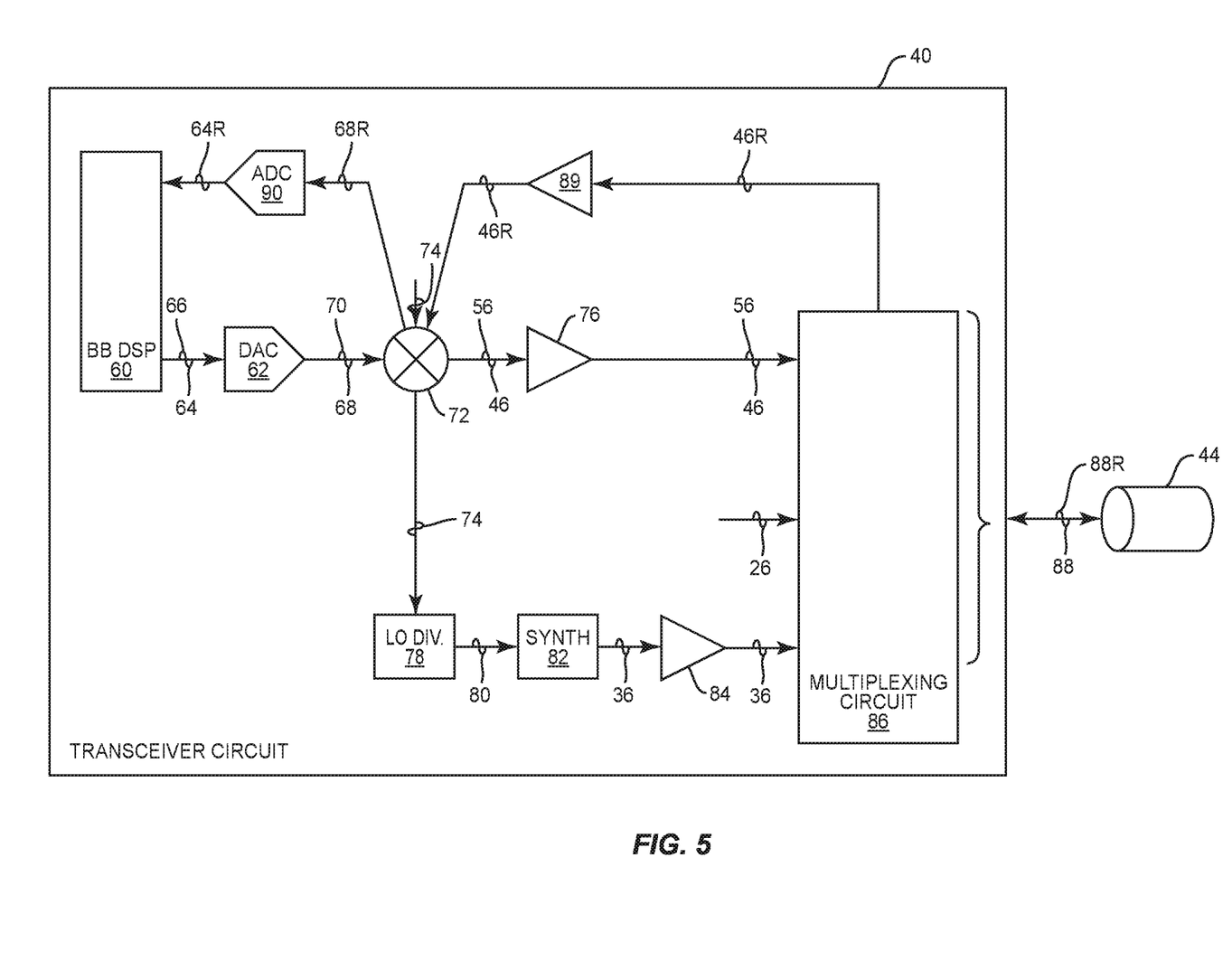
FIG. 5 is a schematic diagram of providing an exemplary illustration of a transceiver circuit provided in the multi-RAT circuit of FIG. 3 according to one embodiment of the present disclosure.

FIG. 5 is a schematic diagram providing an exemplary illustration of the transceiver circuit 40 in the multi-RAT circuit 38 of FIG. 3 according to one embodiment of the present disclosure. Common elements between FIGS. 3 and 5 are shown therein with common element numbers and will not be re-described herein.

The transceiver circuit 40 includes at least one baseband digital-signal-processor (DSP) 60 coupled to at least one digital-to-analog converter (DAC) 62. In a non-limiting example, the baseband DSP 60 is configured to generate a digital baseband signal 64 and a second digital baseband signal 66. The DAC 62 is configured to convert the digital baseband signal 64 and the second digital baseband signal 66 into an analog baseband signal 68 and second analog baseband signal 70, respectively. It should be appreciated that the transceiver circuit 40 may also employ separate baseband DSPs for generating the digital baseband signal 64 and the second digital baseband signal 66, respectively. Notably, the transceiver circuit 40 may also generate 3G/4G RF signals (not shown) for communication in the 3G/4G narrowband 12 of FIG. 2.

The transceiver circuit 40 may include at least one mixer 72 configured to modulate (e.g., up-convert) the analog baseband signal 68 and the second analog baseband signal 70 to the RF signal 46 in the signal band (e.g., the IF band 30 in FIG. 2) and the second RF signal 56 in the second signal band (e.g., 5G UHB 43) based on an LO frequency 74. The RF signal 46 and the second RF signal 56 may be amplified by at least one signal power amplifier 76.

The transceiver circuit 40 may include an LO divider 78. In a non-limiting example, the LO divider 78 divides the LO frequency 74 by a predetermined dividing factor (e.g., 2) to generate a divided LO frequency 80. The transceiver circuit 40 includes a synthesizer 82 configured to generate the LO pilot 36 based on the divided LO frequency 80. The transceiver circuit 40 may include an LO amplifier 84 for amplifying the LO pilot 36. The transceiver circuit 40 may further generate the control signals 26 in the baseband 24 of FIG. 2 for controlling the power head circuit 48 and/or the second power head circuit 58 in the RF circuit 42.

The transceiver circuit 40 may include a multiplexing circuit 86 configured to multiplex the RF signal 46, the second RF signal 56, the LO pilot 36, and the control signals 26 to generate a multiplexed RF signal 88. The multiplexed RF signal 88 may be propagated from the transceiver circuit 40 to the RF circuit 42 via the interconnect medium 44. As previously shown in FIG. 2, the control signals 26, the RF signal 46, the second RF signal 56, and the LO pilot 36 are non-overlapping with each other in the enhanced spectrum map 28. As such, the multiplexing circuit 86 may be configured to multiplex the control signals 26, the RF signal 46, the second RF signal 56, and the LO pilot 36 into the multiplexed RF signal 88 based on frequency-division duplexing (FDD).

The multiplexing circuit 86 receives a multiplexed RF receive signal 88R from the interconnect medium 44. The multiplexing circuit 86 de-multiplexes the multiplexed RF receive signal 88R to generate the RF receive signal 46 in the signal band (e.g., IF band) and provides the RF receive signal 46R to a low-noise amplifier (LNA) 89. The mixer 72 is configured to modulate (e.g., down-convert) the RF receive signal 46R from the signal band (e.g., the IF band 30 in FIG. 2) to generate an analog baseband receive signal 68R. The analog baseband receive signal 68R is then converted to a digital baseband receive signal 64R by an analog-to-digital converter (ADC) 90.

Figure 6A:
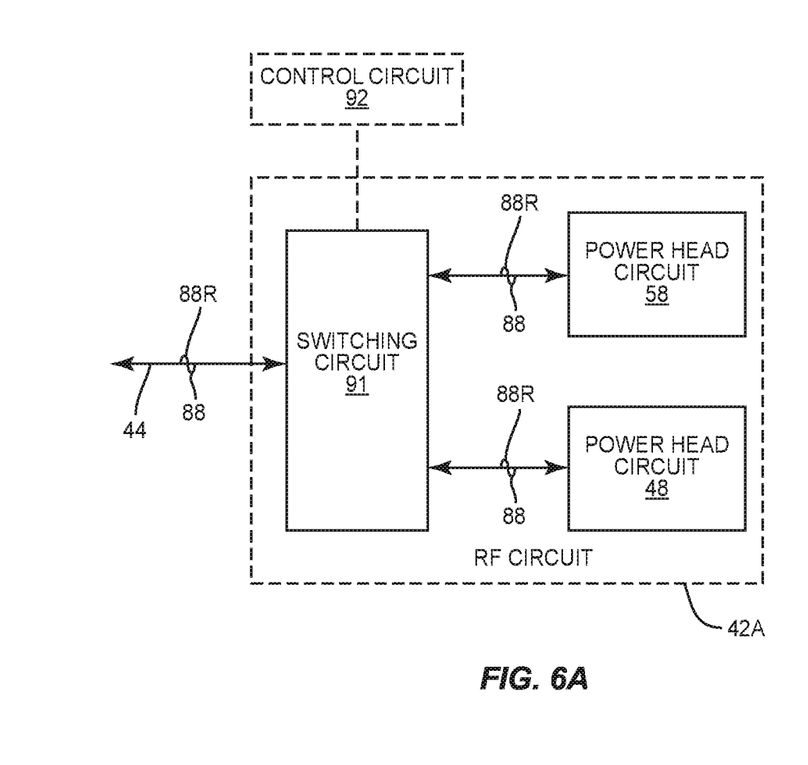
FIGS. 6A-6C are schematic diagrams providing exemplary illustrations of possible topologies for implementing a radio frequency (RF) circuit in the multi-RAT circuit of FIG. 3.
Figure 6B:
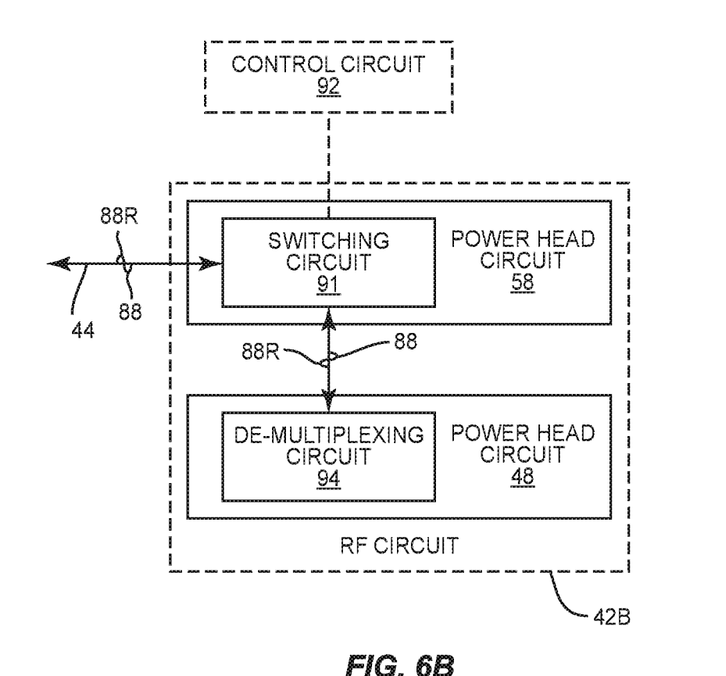
Figure 6C:
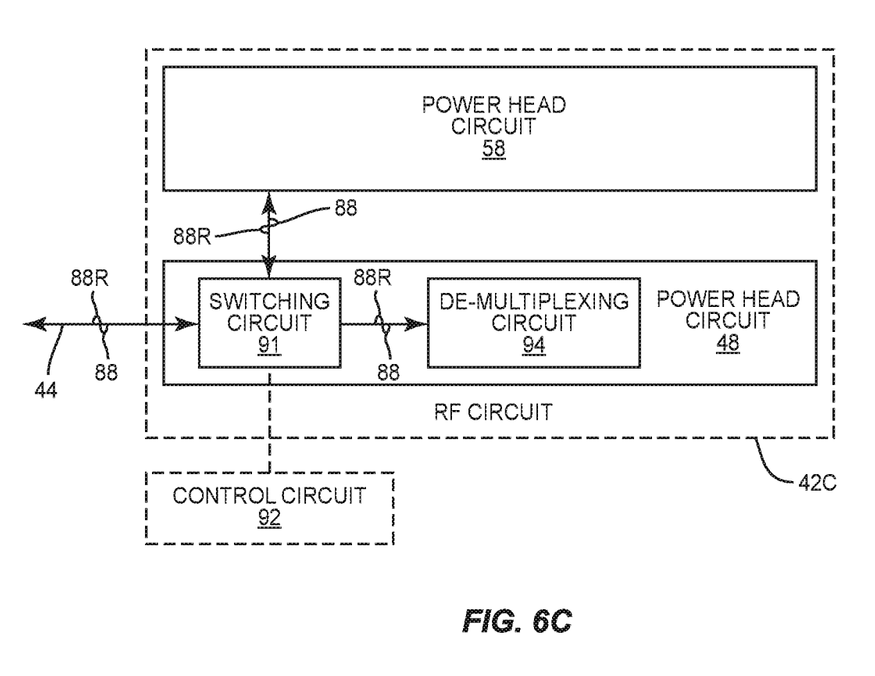

The power head circuit 48 and the second power head circuit 58 in the multi-RAT circuit 38 of FIG. 3 can be either collocated or separated. In this regard, FIGS. 6A-6C are schematic diagrams providing exemplary illustrations of possible topologies for implementing the RF circuit 42 in the multi-RAT circuit 38 of FIG. 3. Common elements between FIGS. 3, 4, 5, and 6A-6C are shown therein with common element numbers and will not be re-described herein.

FIG. 6A is a schematic diagram of an exemplary RF circuit 42A configured according to one embodiment of the present disclosure. The RF circuit 42A includes a switching circuit 91 that is coupled to the interconnect medium 44 to receive the multiplexed RF signal 88. The switching circuit 91 may be provided as a standalone switching circuit without being integrated with either the power head circuit 48 or the second power head circuit 58. The switching circuit 91 may be controlled by a control circuit 92 to provide the multiplexed RF signal 88 to the power head circuit 48 and the second power head circuit 58. The control circuit 92, which may be a microprocessor, a microcontroller, or a field-programmable gate array (FPGA), can control the switching circuit 91 to provide the multiplexed RF signal 88 to the power head circuit 48 and the second power head circuit 58 either concurrently or based on time-division duplexing (TDD).

In a non-limiting example, the power head circuit 48 and the second power head circuit 58 can be collocated in close proximity. In this regard, it may also be possible to provide an injection-locked/frequency-locked VCO in the second power head circuit 58 to generate the LO signal 52 based on the LO pilot 36 and then provide the LO signal 52 to the power head circuit 48. As such, the second power head circuit 58 may include a second de-multiplexing circuit (not shown) to extract the LO pilot 36 from the multiplexed RF signal 88.

FIG. 6B is a schematic diagram of an exemplary RF circuit 42B configured according to another embodiment of the present disclosure. In the RF circuit 42B, the switching circuit 91 is integrated with the second power head circuit 58. In this regard, the switching circuit 91 receives the multiplexed RF signal 88 from the interconnect medium 44 and provides the multiplexed RF signal 88 to the power head circuit 48. The power head circuit 48 may include a de-multiplexing circuit 94, which is configured to de-multiplex the multiplexed RF signal 88 to extract the RF signal 46 and the LO pilot 36.

FIG. 6C is a schematic diagram of an exemplary RF circuit 42C configured according to another embodiment of the present disclosure. In the RF circuit 42C, the switching circuit 91 is integrated with the power head circuit 48. In this regard, the switching circuit 91 receives the multiplexed RF signal 88 from the interconnect medium 44 and provides the multiplexed RF signal 88 to the second power head circuit 58.

Figure 7:
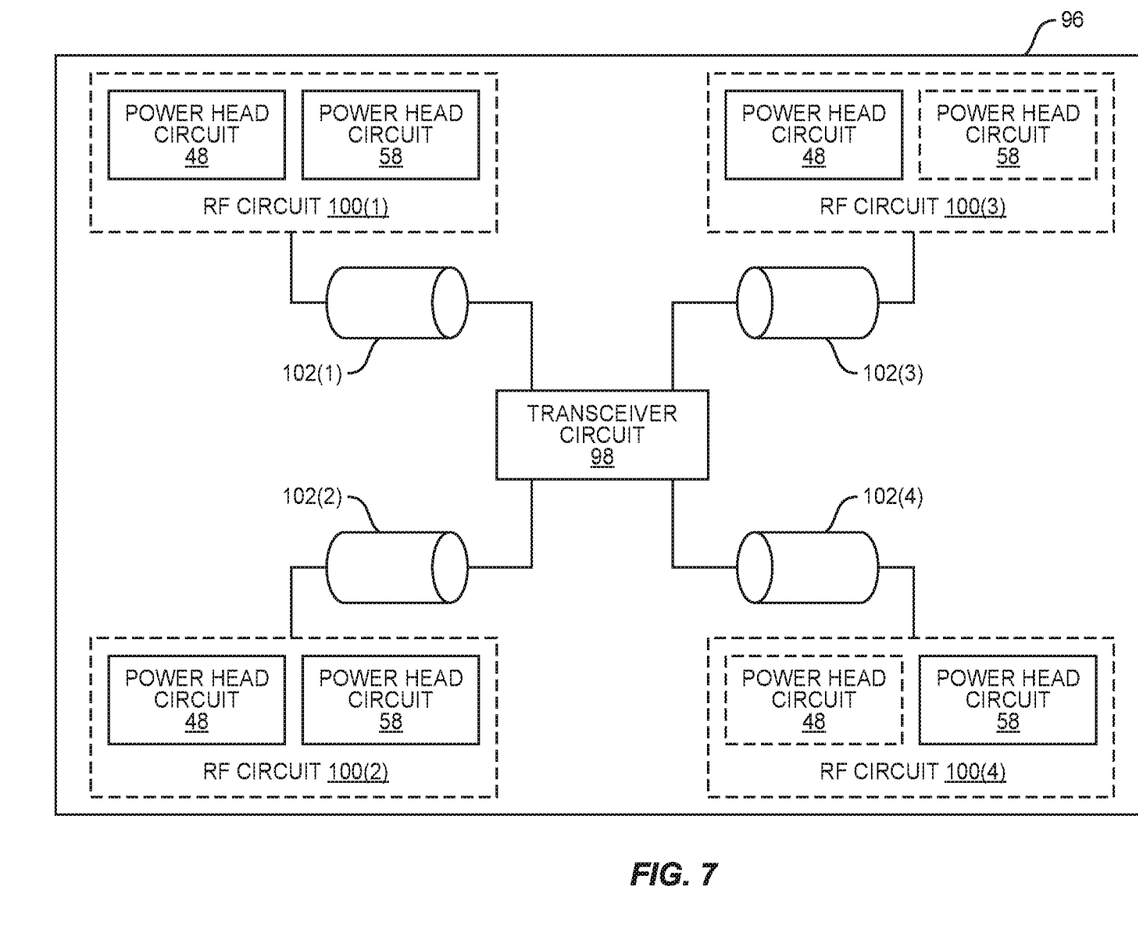
FIG. 7 is a schematic diagram of an exemplary multi-RAT apparatus configured to include equal number of RF circuits and interconnect mediums.

Multiple RF circuits, such as the RF circuit 42 of FIG. 3, can be provided in a multi-RAT apparatus (e.g., a smartphone) to support RF beamforming and/or multiple-input multiple-output (MIMO) operations. In this regard, FIG. 7 is a schematic diagram of an exemplary multi-RAT apparatus 96 configured to include an equal number of RF circuits and interconnect mediums.

The multi-RAT apparatus 96 includes at least one transceiver circuit 98, a first number of RF circuits 100(1)-100(4), and a second number of interconnect mediums 102(1)-102(4). In examples discussed herein, there are an equal number of RF circuits and interconnect mediums. As such, the RF circuits 100(1)-100(4) can be coupled to the transceiver circuit 98 via the interconnect mediums 102(1)-102(4), respectively. Although the multi-RAT apparatus 96 is shown to include only the RF circuits 100(1)-100(4) and the interconnect mediums 102(1)-102(4), it should be appreciated that the multi-RAT apparatus 96 can be configured to include any suitable number of RF circuits and interconnect mediums based on a variety of topologies. It should also be appreciated that the transceiver circuit 98 can be implemented with multiple transceiver circuits and/or transceiver sub-systems.

The transceiver circuit 98 can be functionally equivalent to the transceiver circuit 40 in FIG. 3. In this regard, the specific configuration and functionality as discussed in FIG. 5 are applicable to the transceiver circuit 98 as well. Further, some or all of the RF circuits 100(1)-100(4) can be configured to function like the RF circuit 42 in FIG. 3. Accordingly, the specific configurations and functionalities as discussed in FIGS. 4 and 6A-6C are applicable to those RF circuits as well.

Notably, at least one RF circuit (e.g., the RF circuits 100(1), 100(2)) among the RF circuits 100(1)-100(4) can include the power head circuit 48 and the second power head circuit 58. Depending on specific usage scenarios supported by the multi-RAT apparatus 96, some RF circuits (e.g., the RF circuit 100(3)) may include only the power head circuit 48, while some other RF circuits (e.g., the RF circuit 100(4)) may include only the second power head circuit 58. In a non-limiting example, the power head circuit 48 in each of the RF circuits 100(1)-100(4) can be coupled to a respective antenna array (not shown) for supporting RF beamforming. The second power head circuit 58 in each of the RF circuits 100(1)-100(4) may be coupled to a respective antenna (not shown) for supporting MIMO operations.

Figure 8:
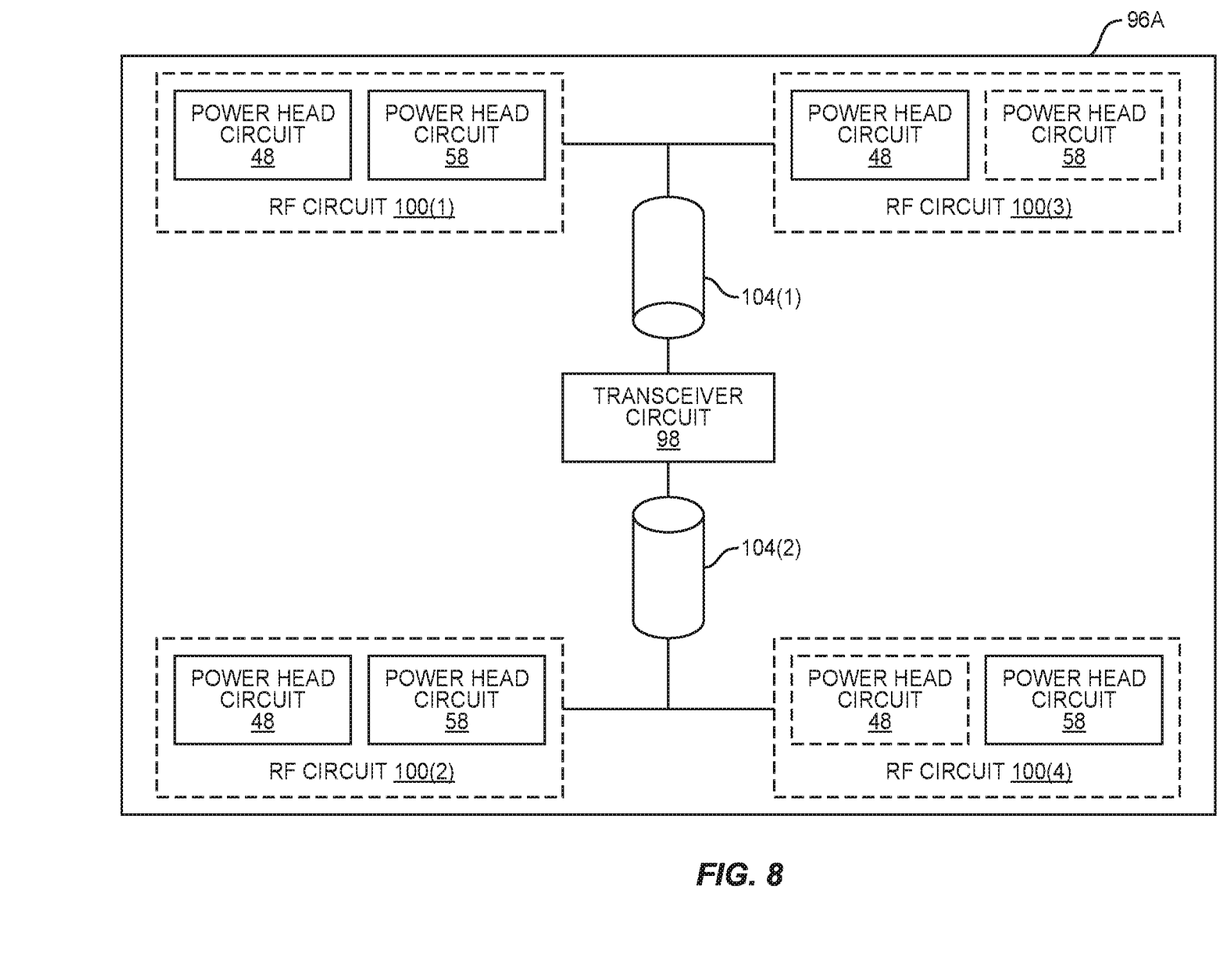
FIG. 8 is a schematic diagram of an exemplary multi-RAT apparatus configured to include more RF circuits than interconnect mediums.

FIG. 8 is a schematic diagram of an exemplary multi-RAT apparatus 96A configured to include more RF circuits than interconnect mediums. Common elements between FIGS. 7 and 8 are shown therein with common element numbers and will not be re-described herein.

The multi-RAT apparatus 96A includes a second number of interconnect mediums 104(1)-104(2). In this regard, there are more RF circuits than interconnect mediums. In a non-limiting example, the interconnect medium 104(1) can be configured to couple the transceiver circuit 98 to the RF circuits 100(1), 100(3), and the interconnect medium 104(2) can be configured to couple the transceiver circuit 98 to the RF circuits 100(2), 100(4).

Those skilled in the art will recognize improvements and modifications to the preferred embodiments of the present disclosure. All such improvements and modifications are considered within the scope of the concepts disclosed herein and the claims that follow.

What is claimed is:

1. A multi-radio access technology (multi-RAT) circuit comprising:
   at least one interconnect medium configured to:
      propagate a radio frequency (RF) signal in a signal band in a defined frequency spectrum; and
      propagate a local oscillation (LO) pilot as a separate signal from the RF signal at an LO frequency higher than an upper frequency boundary of the defined frequency spectrum; and
   at least one RF circuit coupled to the at least one interconnect medium, the at least one RF circuit comprising a power head circuit configured to:
      receive concurrently the RF signal and the LO pilot from the at least one interconnect medium;
      generate an LO signal based on the LO pilot, wherein the LO frequency is located at a sub-harmonic of the LO signal;
      modulate the RF signal from the signal band to a carrier band based on the LO signal; and
      transmit the RF signal in the carrier band.

2. The multi-RAT circuit of claim 1 wherein the power head circuit is further configured to:
   receive an RF receive signal in the carrier band;
   modulate the RF receive signal from the carrier band to the signal band based on the LO signal; and
   provide the RF receive signal to the at least one interconnect medium.

3. The multi-RAT circuit of claim 1 wherein the power head circuit is further configured to generate the LO signal based on the LO pilot without a synthesizer.

4. The multi-RAT circuit of claim 1 wherein:
   the at least one interconnect medium is further configured to propagate a second RF signal in a second signal band; and
   the at least one RF circuit further comprises a second power head circuit configured to receive and transmit the second RF signal in the second signal band.

5. The multi-RAT circuit of claim 4 wherein the signal band is collocated with the second signal band in the defined frequency spectrum without overlapping with the second signal band.

6. The multi-RAT circuit of claim 4 wherein:
   the power head circuit is further configured to receive the RF signal in an intermediate frequency (IF) signal band in a fifth-generation (5G) wideband; and
   the second power head circuit is further configured to receive the second RF signal in a 5G signal band in the 5G wideband.

7. The multi-RAT circuit of claim 4 further comprising a transceiver circuit coupled to the at least one interconnect medium, the transceiver circuit is configured to generate the RF signal, the second RF signal, and the LO pilot.

8. The multi-RAT circuit of claim 7 wherein the transceiver circuit comprises:
   a mixer configured to modulate the second RF signal to the second signal band based on an LO frequency;
   an LO divider configured to divide the LO frequency to generate a divided LO frequency; and
   a synthesizer configured to generate the LO pilot based on the divided LO frequency.

9. The multi-RAT circuit of claim 7 wherein the transceiver circuit comprises a multiplexing circuit configured to:
   multiplex the RF signal, the second RF signal, and the LO pilot to generate a multiplexed RF signal; and
   provide the multiplexed RF signal to the at least one interconnect medium.

10. The multi-RAT circuit of claim 9 wherein the at least one RF circuit further comprises a switching circuit coupled to the at least one interconnect medium, the switching circuit is configured to:
   receive the multiplexed RF signal from the at least one interconnect medium; and provide the multiplexed RF signal to the power head circuit and the second power head circuit.

11. The multi-RAT circuit of claim 10 wherein the switching circuit is a standalone switching circuit not integrated with the power head circuit and the second power head circuit.

12. The multi-RAT circuit of claim 10 wherein the switching circuit is provided in the power head circuit and configured to:
  receive the multiplexed RF signal from the at least one interconnect medium; and
  provide the multiplexed RF signal to the second power head circuit.

13. The multi-RAT circuit of claim 10 wherein the switching circuit is provided in the second power head circuit and configured to:
  receive the multiplexed RF signal from the at least one interconnect medium; and
  provide the multiplexed RF signal to the power head circuit.

14. The multi-RAT circuit of claim 10 wherein the power head circuit comprises a de-multiplexing circuit configured to de-multiplex the multiplexed RF signal to extract the RF signal and the LO pilot.

15. The multi-RAT circuit of claim 14 wherein the power head circuit further comprises an LO generator configured to multiply the LO frequency of the LO pilot by a predetermined multiplying factor to generate the LO signal.

16. The multi-RAT circuit of claim 14 wherein the power head circuit further comprises an injection-locked/frequency locked voltage controlled oscillator (VCO) configured to generate the LO signal based on the LO pilot.

17. The multi-RAT circuit of claim 10 wherein the second power head circuit comprises a second de-multiplexing circuit configured to de-multiplex the multiplexed RF signal to extract the second RF signal and the LO pilot.

18. The multi-RAT circuit of claim 17 wherein the second power head circuit further comprises an injection-locked/frequency locked voltage controlled oscillator (VCO) configured to generate the LO signal based on the LO pilot and provide the LO signal to the power head circuit.

19. A multi-radio access technology (multi-RAT) apparatus comprising:
  at least one transceiver circuit;
  a first number of radio frequency (RF) circuits; and
  a second number of interconnect mediums coupled between the at least one transceiver circuit and the first number of RF circuits;
  wherein at least one RF circuit among the first number of RF circuits comprises a power head circuit, the power head circuit is configured to:
    receive separately an RF signal in a signal band in a defined frequency spectrum and a local oscillation (LO) pilot located at an LO frequency higher than an upper frequency boundary of the defined frequency spectrum from a respective interconnect medium among the second number of interconnect mediums;
    generate an LO signal based on the LO pilot, wherein the LO frequency is located at a sub-harmonic of the LO signal;
    modulate the RF signal from the signal band to a carrier band based on the LO signal; and
    transmit the RF signal in the carrier band.

20. The multi-RAT apparatus of claim 19 wherein the power head circuit is further configured to:
  receive an RF receive signal in the carrier band;
  modulate the RF receive signal from the carrier band to the signal band based on the LO signal; and
  provide the RF receive signal to the at least one interconnect medium.

21. The multi-RAT apparatus of claim 19 wherein the at least one RF circuit further comprises a second power head circuit configured to:
  receive a second RF signal in a second signal band from the respective interconnect medium; and
  transmit the second RF signal in the second signal band.

22. The multi-RAT apparatus of claim 19 wherein the first number of RF circuits equals the second number of interconnect mediums.

23. The multi-RAT apparatus of claim 19 wherein the first number of RF circuits is greater than the second number of interconnect mediums.

* * * * *